US011329971B2

(12) United States Patent
Hayes

(10) Patent No.: US 11,329,971 B2
(45) Date of Patent: May 10, 2022

(54) CONFIDENCE BROKER SYSTEM

(71) Applicant: Blue Armor Technologies, LLC, Houston, TX (US)

(72) Inventor: John William Hayes, Reno, NV (US)

(73) Assignee: BLUE ARMOR TECHNOLOGIES, LLC, Houston, TX (US)

( * ) Notice: Subject to any disclaimer, the term of this patent is extended or adjusted under 35 U.S.C. 154(b) by 0 days.

(21) Appl. No.: 16/602,219

(22) Filed: Aug. 28, 2019

(65) Prior Publication Data

US 2021/0234854 A1 Jul. 29, 2021

(51) Int. Cl.
*H04L 9/40* (2022.01)
*H04L 29/06* (2006.01)
*H04L 9/32* (2006.01)

(52) U.S. Cl.
CPC ........ *H04L 63/0823* (2013.01); *H04L 9/3263* (2013.01); *H04L 63/20* (2013.01)

(58) Field of Classification Search
CPC ... H04L 63/0823; H04L 9/3263; H04L 63/20; H04L 9/006; G06F 21/33; H04W 12/069
See application file for complete search history.

(56) References Cited

U.S. PATENT DOCUMENTS

2012/0123953 A1* 5/2012 Jabara ................. G06Q 30/018
  705/317
2014/0279817 A1* 9/2014 Whitman .............. G06F 16/637
  706/52
2015/0089568 A1* 3/2015 Sprague ................ H04L 63/126
  726/1
2015/0304736 A1* 10/2015 Lal .......................... G06F 21/72
  380/210
2017/0093916 A1* 3/2017 Arumugam .......... H04L 63/0428
2019/0354351 A1* 11/2019 Liu ........................ H04L 51/066
2019/0386974 A1* 12/2019 Fernando ............. H04W 12/084
2020/0066071 A1* 2/2020 Budman ............... H04L 63/107

(Continued)

OTHER PUBLICATIONS

Leigh Davis, "A Patterned Approach for Linking Knowledge-Based Systems to External Resources," Feb. 2004, pp. 222-233. (Year: 2004).*

(Continued)

*Primary Examiner* — Luu T Pham
*Assistant Examiner* — Canh Le
(74) *Attorney, Agent, or Firm* — Crain Caton & James; James E. Hudson, III

(57) ABSTRACT

A Confidence Broker System is disclosed. One embodiment of the present invention includes a confidence broker (10) which communicates with a plurality of confidence producers (12A, 12B, 12C) and a plurality of confidence consumers (14A, 14B, 14C). Communications between these elements is conducted via a communications infrastructure (16). The confidence broker (10) also includes a communications interface (42) which is connected to a protocol converter (44). The protocol converter (44) is connected to a confidence normalizer (46). The confidence normalizer (46) is connected to a confidence mediator (48). The confidence mediator (48) is connected to a confidence mapper (50). The confidence mapper (50) is connected to the protocol converter (44). Each of the protocol converter (44), the confidence normalizer (46), the confidence mediator (48) and the confidence mapper (50) is connected to a storage device (52).

20 Claims, 14 Drawing Sheets

(56) References Cited

U.S. PATENT DOCUMENTS

2020/0358662 A1* 11/2020 Kundu ................. G06N 3/0454
2020/0366716 A1* 11/2020 Singh .................. G06F 21/6245
2020/0366718 A1* 11/2020 Novo Diaz ........... H04L 63/166

OTHER PUBLICATIONS

Ana Nicolaescu et al. "On Adequate Behavior-based Architecture Conformance Checks," 2017, pp. 446-455. (Year: 2017).*

* cited by examiner

Figure 4

| Scaling Parameters | Scaling Factor | Scaling Offset |
|---|---|---|
| First Confidence Producer | 0.1 | 0 |
| Second Confidence Producer | 5.0 | 0 |
| Third Confidence Producer | 100.0 | 1 |

| Mediation Parameters | Weight | Recency |
|---|---|---|
| First Confidence Producer | 5 | 30 |
| Second Confidence Producer | 1 | 20 |
| Third Confidence Producer | 2 | 30 |

| Normalized Confidence | 1-49 | 50-79 | 80-89 | 90-100 |
|---|---|---|---|---|
| First Confidence Consumer | 1 | 2 | 3 | 4 |
| Second Confidence Consumer | 3 | 4 | 5 | 6 |
| Third Confidence Consumer | 1 | 50 | 80 | 90 |

CONFIDENCE BROKER SYSTEM

FIELD OF THE INVENTION

The present invention relates to computer network security, to identity authentication and to identity confidence analytics. More particularly, one embodiment of the present invention pertains to methods for communicating and normalizing the confidence in an identity produced by analytics systems, and for mapping and conveying that identity confidence to multiple policy enforcement systems.

BACKGROUND OF THE INVENTION

Identity and the use of identity credentials have long been used as components and processes in security systems. Specifically, an identity credential conveys that the person or entity is who they purport to be. An entity may be a computer, information appliance, server, or some other device and/or software program. The process of evaluating an identity credential is called authentication; the determination that the presented identity credential is authentic. Credentials may include additional features such as an expiration, after which time the credential is not valid. Credentials also include various forms of binding which binds the credential to the person or entity. An example is a drivers license. Most drivers license include a picture of the drivers, their height, weight, age, eye and hair color. The picture, height, weight, etc are the bindings of this identity credential. These bindings are used to determine that the person presenting the drivers license is the person to whom the driver's license was issued. The process of identity credential authentication, regardless of specific type of identity credential being used and its associated bindings, always results in a binary answer. The credential is either authentic and valid or inauthentic and invalid. This is true of physical identity credentials such as drivers licenses and of digital identity credentials such as PKI certificates. All identity credentials, after evaluation, are either valid or invalid.

The binary nature of identity authentication leaves security systems, security processes and the assets they protect vulnerable to compromise when an identity credential is misused by a trusted insider, or when the identity credential is stolen and used by someone other than the person or entity to whom the credential was issued.

To address these vulnerabilities and to provide a more robust information for security enforcement using identity credentials, the concept of confidence has been introduced. While identity credential evaluation is still binary—valid or invalid, confidence is an additional measurement as to how much trust to place on the identity credential based on additional factors.

For example, on the internet, a computer laptop has a PKI certificate, a digital identity credential, indicating the authenticity of the laptop. That laptop is expected to only ever operate within the geographic boundaries of the United States. If that laptop is then compromised by malware and the PKI certificate is stolen, and an attempt is made to use that certificate from a geographic location outside of the United States, while the certificate is valid, the confidence in that certificate is very low.

The systems that determine the confidence associated with an identity credential are analytics systems. These analytics systems take information from many sources over time to generate a confidence value. Every time a credit card is used, an analytics system operated by the credit card provider performs a confidence evaluation. This confidence evaluation is then used by the credit card company to determine if the credit card transaction is allowed to proceed. This is a primary mechanism used to detect stolen credit cards.

In addition to the analytics systems that generate identity confidence, policy enforcement systems use that generated confidence to enforce policy based on both the identity credential and its associated confidence. Returning to the example of the credit card company above, the policy enforcement system takes different actions based on the confidence. For example, if the confidence is high, the credit card transaction will be allowed to proceed. If the confidence is medium, the credit card company may issue an automated phone call to the card holder's cell phone to determine if this is a legitimate transaction. If the confidence level is low, then the transaction may be denied immediately. The process of taking these different actions based on the confidence is performed by a policy enforcement system.

In the above examples, both the analytics systems generating identity confidence and the policy enforcement systems use the same confidence definitions and communications mechanisms used to communicate between the confidence producers—the analytics system, and the confidence consumers—the policy enforcement system. When multiple analytics systems and multiple policy enforcement systems, each with different definitions of confidence and confidence communication mechanisms are required to work together, it is necessary to have an intermediary—a confidence broker, translating confidence so it can be properly interpreted by all policy enforcement systems.

A system which enhances the communication and interoperability of systems producing and consuming identity confidence would enable security systems that are more robust and secure. The development of such a system would constitute a major technological advance, and would satisfy long felt needs and aspirations in the network security industry.

SUMMARY OF THE INVENTION

In one embodiment of the present invention, a Confidence Broker receives confidence indications from a variety of different analytics systems called confidence producers. These confidence indications include a confidence value and an associated identity. Most analytics systems operate as scoring engines. Scoring engines do not produce a yes or no answer. They produce a "score" within a range. For example, one analytics system may produce scores ranging from 1 to 1000, while a second analytics system may produce scores ranging from 0 to 99. For these scores to be compared, they need to be normalized to a common normalized range. Normalization is a process in which the scale of the range is changed to allow scores from different analytics system to be compared. Assuming a normalized range of 1-100, the score produced from the first analytics system is multiplied by a scaling factor of 0.1 to produce a normalized confidence. The score from the second analytics system need to be offset by 1 (a scaling offset of 1 added the confidence value to produce a normalized confidence). Each confidence producer is configured with a scaling factor and a scaling offset. The normalization process enables different confidence producers which have different confidence scales to be evaluated together.

Once the confidence value has been normalized, it must be mapped to each policy enforcement system, which are called confidence consumers. Unlike confidence producers, which generate a range of confidences, confidence consumers may have discrete actions associated with specific confidences. The mapping takes a series of ranges of the normalized confidence and maps them to consumer specific confidence values. For instance, a first consumer may have 4 policy enforcement options, numbered 1-4. Normalized confidence values 1-49 are mapped to first consumer confidence 1, normalized confidence values 50-79 are mapped to first consumer confidence 2, normalized confidence values 80-89 are mapped to first consumer confidence 3 and normalized confidence values 90-100 are mapped to first consumer confidence 4. A second consumer has 8 policy enforcement confidences, but only 4 of those consumer confidence values are used. Normalized confidence values 1-49 are mapped to second consumer confidence 3, normalized confidence values 50-79 are mapped to second consumer confidence 4, normalized confidence values 80-89 are mapped to second consumer confidence 5 and normalized confidence values 90-100 are mapped to second consumer confidence 6. Each confidence consumer is configured with a map that translates normalized confidence values to consumer specific confidence values. Once the consumer specific confidence values have been determined, the consumer specific confidence value is conveyed to each confidence consumer.

If a second confidence indication is received from a different confidence producer for the same identity and, after confidence normalization and confidence consumer mapping, results in a different consumer specific confidence value, a mediation process is needed. The mediation process is needed to prevent two conflicting confidence producers from generating an oscillating series of consumer specific confidences.

An appreciation of other aims and objectives of the present invention and a more complete and comprehensive understanding of this invention may be obtained by studying the following description of a preferred embodiment, and by referring to the accompanying drawings.

A BRIEF DESCRIPTION OF THE DRAWINGS

FIG. 4 shows scaling parameters in a table.

FIG. 5 shows mediation parameters in a table.

FIG. 6 shows a consumer confidence mapping parameters in a table.

A DETAILED DESCRIPTION OF PREFERRED & ALTERNATIVE EMBODIMENTS

I. Overview of the Invention

Figure 1:
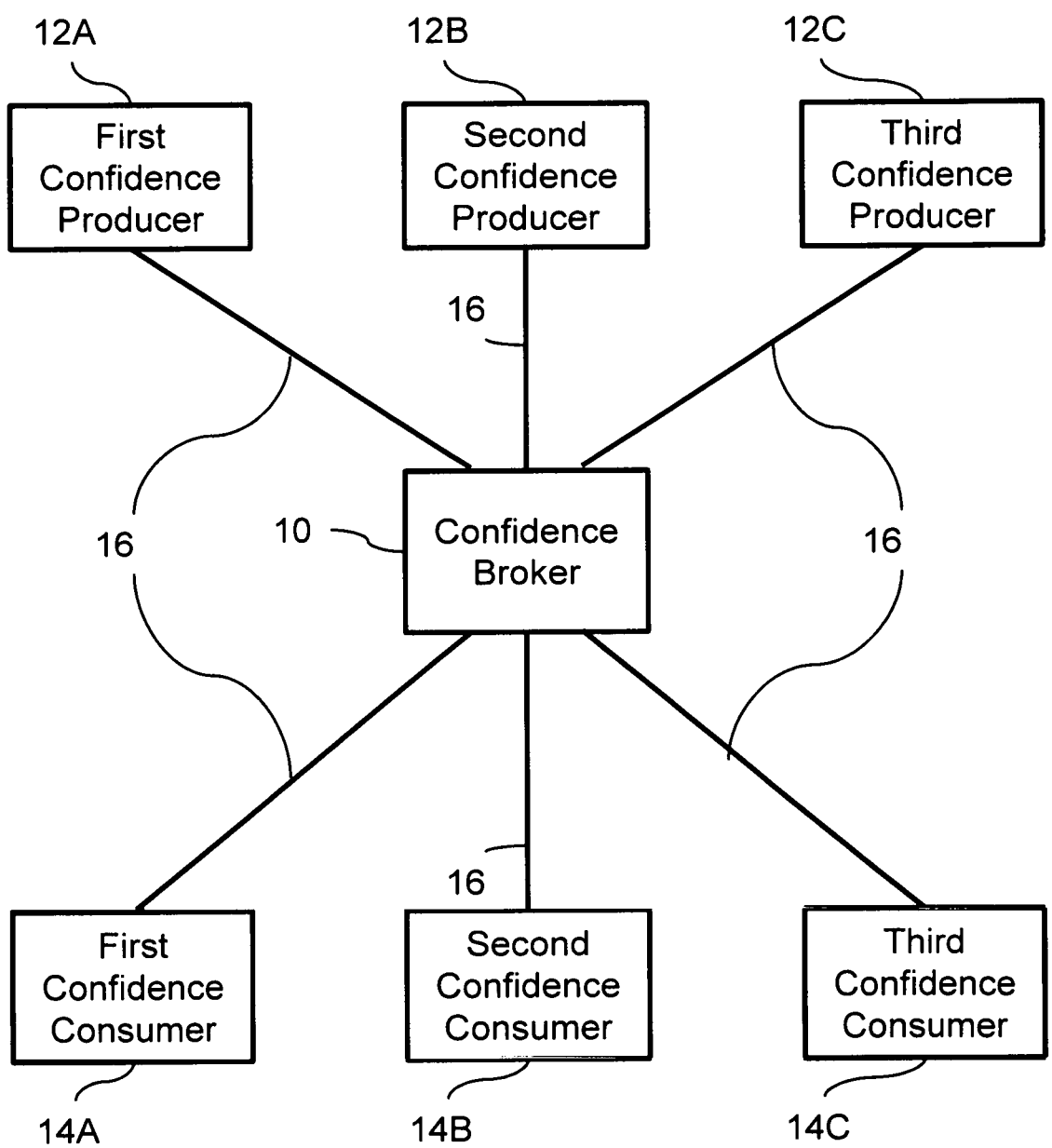
FIG. 1 shows a diagram of the present invention with multiple identity confidence producers and consumers.

The present invention receives confidence indications from a confidence producer. A confidence indication is a confidence value and an associated identity. The received confidence value to scaled to a normalized confidence value using a scaling factor and a scaling offset. The resulting normalized confidence value, its associated identity, the confidence producer and a timestamp of when the confidence indication was received is stored in storage.

For each of the confidence consumers, the normalized confidence is mapped to a consumer specific confidence value. A confidence indication is then sent to each of the confidence consumers using the consumer specific confidence value.

If a second confidence indication is received from a different confidence producer for the same identity and, after confidence normalization and confidence consumer mapping, results in a different consumer specific confidence value, a mediation process is needed. The mediation process is needed to prevent two conflicting confidence producers from generating an oscillating series of consumer specific confidences. The mediation process can use one of several algorithms. In a preferred embodiment, the average of the normalized confidence values can be used in the consumer specific mapping process. The average can use different weights assigned to different confidence producers. The averaging process can select conferences to average based on their recency—such as using confidences that have been reported within the last 30 minutes. Weighting can be also varied based on recency with more recent confidence indications being given higher weighting. All of these approaches can be combined together to achieve a mediated normalized confidence. When a mediated normalized confidence is used in the consumer specific mapping, more consistent consumer specific confidence values will be generated.

II. Definition of Terms

Analytics—A system or apparatus that takes sensor and data inputs from multiple sources to produce a coordinated view of activity. Analytics may employ "big data" and "artificial intelligence" techniques. Analytics can provide situational awareness, baseline and out of parameter behavioral indications, security anomaly detection and other multi variate analysis.

Authentication—The act of confirming the truth of an attribute claimed true by an entity.

Communication Interface—A component of a confidence broker that provides communications between the confidence broker and other external devices and systems.

Confidence Broker—A system that processes confidence indications from multiple confidence producers and communicates the processed confidence indications to multiple confidence consumers.

Confidence Consumer—A policy enforcement device that uses identity and identity confidence in its processing.

Confidence Indication—An indication of an identity and its associated confidence.

Confidence Mapper—A component of a confidence broker that tailors a confidence indication to a specific confidence consumer.

Confidence Mediator—A component of a confidence broker that combines multiple confidence indications for the same identity from different confidence producers resulting in a mediated confidence.

Confidence Normalizer—A component of a confidence broker that changes the scale of a confidence value from a confidence producer to allow confidence values from different confidence producers to be compared.

Confidence Producer—An analytics system that produces confidence indications.

Confidence Value—The value in an confidence indication. A confidence indication also includes the identity associated with the confidence value.

CPU—Central Processing Unit. A set of circuits that processes CPU instructions.

CPU Instructions—A set of instructions that controls the operation of a CPU.

Identity—An identity is a collection of attributes about an entity that distinguish it from other entities. Entities are anything with distinct existence, such as people, or devices.

Identity Credential—An identity credential is a set of claims made by an entity about an identity.

Input/Output Interface—An electronic circuit that communicates with other electronic circuits in accordance to a specification.

JSON—JavaScript Object Notation (JSON) is an open-standard file format that uses human-readable text to transmit data objects consisting of attribute—value pairs and array data types (or any other serializable value).

Mediation—A process where a series of values are combined to produce a single value. The process of combining the value can use a variety of mathematical formulas, depending upon the desired result. Examples of mathematical formulas usable for mediation include averaging, weighted averaging, and time weighted averaging.

Memory—An electronic circuit which allows for the temporal storage of data.

Normalization—A process in which the scale of a value is changed to allow values from systems using different numerical scales to be compared. For example, to compare 18 inches to 2 feet, the 2 feet need to be scaled to inches by multiplying by 12 resulting in 24 inches. After scaling, 18 inches can be directly compared to 24 inches.

Protocol Converter—A component of a confidence broker that converts one data format to another.

Query—A request for a record from a storage or database device.

Scaling Factor—In normalization, the value to be normalized is multiplied by the scaling factor and then added to the scaling offset to produce the normalized value.

Scaling Offset—In normalization, the value to be normalized is multiplied by the scaling factor and then added to the scaling offset to produce the normalized value.

Smartcard—A smart card is a physical electronic authorization device, used to control access to a resource. It is typically a plastic credit card sized card with an embedded integrated circuit.

Storage—A technology or device which allows for the reading and writing of data that persists over time. Volatile storage fails after power is removed. Non-volatile storage does not require power to maintain its storage capabilities. Dynamic Random Access Memory is an example of volatile storage. FLASH memory and disk drives are examples of non-volatile storage.

Tamper Resistant—Tamper resistance is resistance to intentional malfunction or sabotage by either the normal users of a product, package, or system or others with physical access to it.

Timestamp—A timestamp is a sequence of characters or encoded information identifying when a certain event occurred, usually giving date and time of day, sometimes accurate to a small fraction of a second.

Weighting—The process of weighting involves emphasizing the contribution of particular aspects of a phenomenon (or of a set of data) over others to a final outcome or result; thereby highlighting those aspects in comparison to others in the analysis. That is, rather than each variable in the data set contributing equally to the final result, some of the data is adjusted to make a greater contribution than others. This is analogous to the practice of adding (extra) weight to one side of a pair of scales in order to favor either the buyer or seller.

XML—Extensible Markup Language (XML) defines a set of rules for encoding documents in a format that is both human-readable and machine-readable.

III. Preferred and Alternative Embodiments

FIG. 1 shows a diagram of a confidence broker 10 communicating with a plurality of confidence producers 12A, 12B, 12C and a plurality of confidence consumers 14A, 14B, 14C. Communications between these elements is via a communications infrastructure 16.

Figure 2:
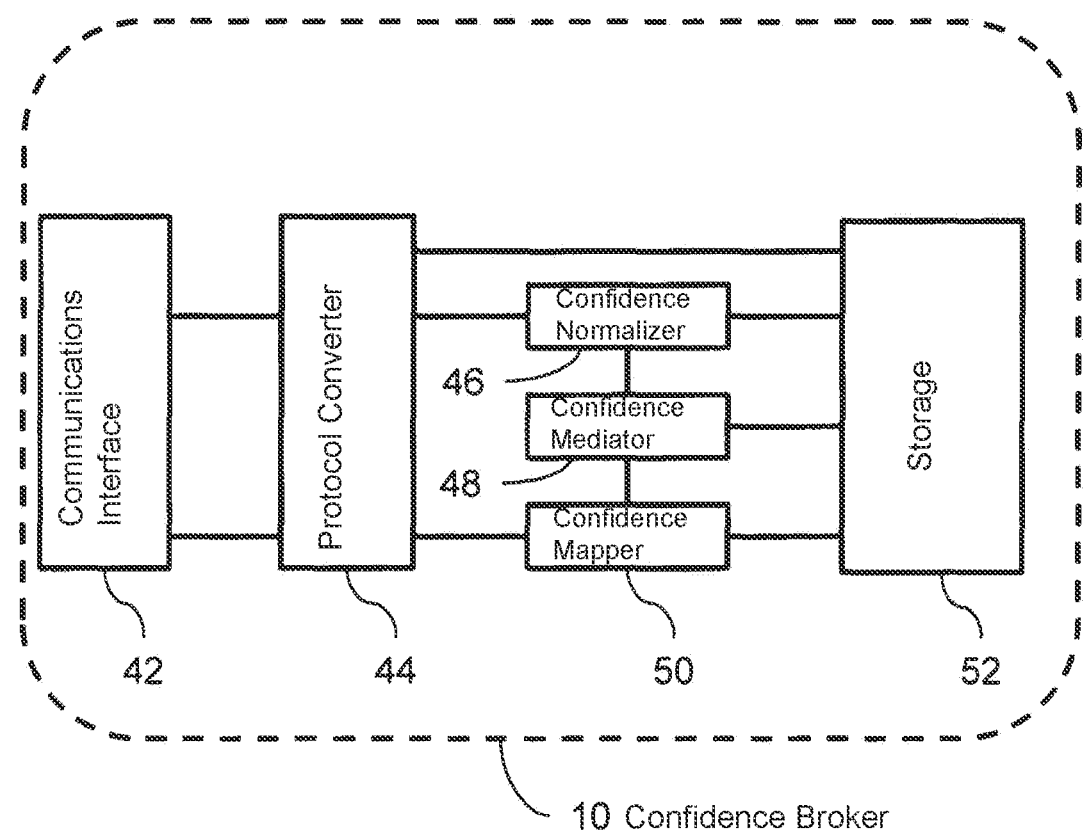
FIG. 2 shows a schematic diagram of the present invention.

FIG. 2 shows a confidence broker 10. The confidence broker 10 is comprised of a communications interface 42 connected to a protocol converter 44. The protocol converter 44 is connected to a confidence normalizer 46. The confidence normalizer 46 is connected to a confidence mediator 48. The confidence mediator 48 is connected to a confidence mapper 50. The confidence mapper 50 is connected to the protocol converter 44. Each of the protocol converter 44, the confidence normalizer 46, the confidence mediator 48 and the confidence mapper 50 is connected to storage 52.

Figure 3:
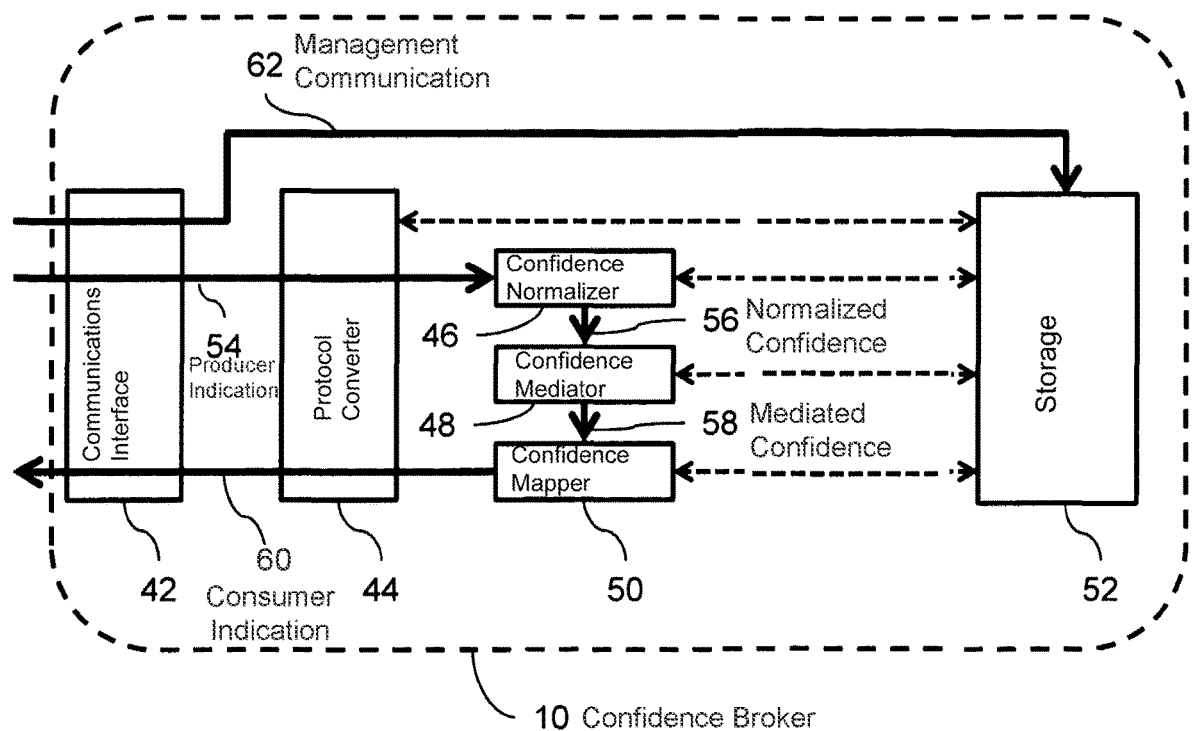
FIG. 3 shows the processing within the present invention.

FIG. 3 shows the signaling within the confidence broker 10. A producer indication 54 is received by the communications interface 42, is processed by the protocol converter 44 and the confidence normalizer 46. The confidence normalizer 46 signals a normalized confidence 56 to the confidence mediator 48. The confidence mediator 48 signals a mediated confidence 58 to the confidence mapper 50. The confidence mapper 50 signals a consumer indication 60 to the protocol converter 44. The protocol converter 44 signals the consumer indication 60 to the communications interface 42. Each of the protocol converter 44, the confidence normalizer 46, the confidence mediator 48 and the confidence mapper 50 communicates with storage 52. Configuration and management of the confidence broker 10 occurs using the management communications 62. The communications interface 42 directs management communications 62 to the storage 52.

FIG. 4 shows scaling parameters 70 in a table.

FIG. 5 shows mediation parameters 80 in a table.

FIG. 6 shows a consumer confidence mapping parameters in a table 90. The consumer confidence mapping parameters 90 includes normalized confidence ranges 92 and mapped consumer confidences 94.

Figure 7:
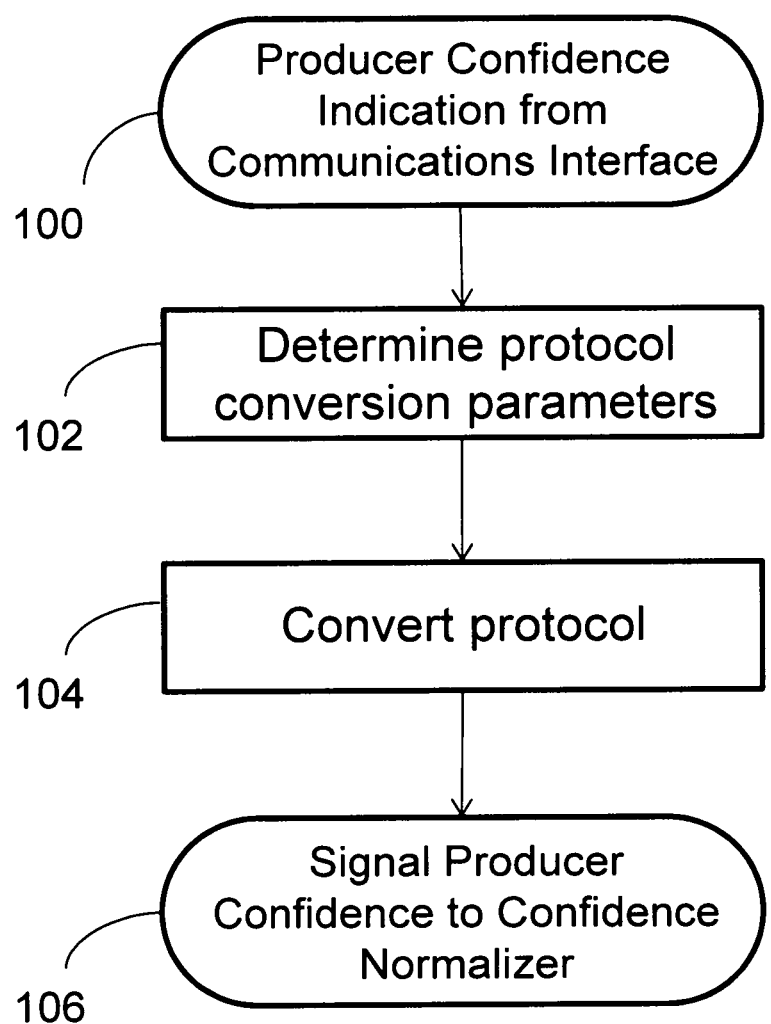
FIG. 7 is a flowchart of the protocol conversion process when a confidence indication is signaled by the communications interface.

FIG. 7 is a flowchart of the protocol conversion process when a producer confidence is signaled by the communications interface. In flowchart 1, step 1 100, a producer confidence indication is signaled from the communications interface. In flowchart 1, step 2 102, the protocol conversion parameters are determined for the confidence producer generating the confidence indication. In flowchart 1, step 3 104, the format of the received confidence indication is converted. In flowchart 1, step 4 106, the converted confidence indication is signaled to the confidence normalizer.

Figure 8:
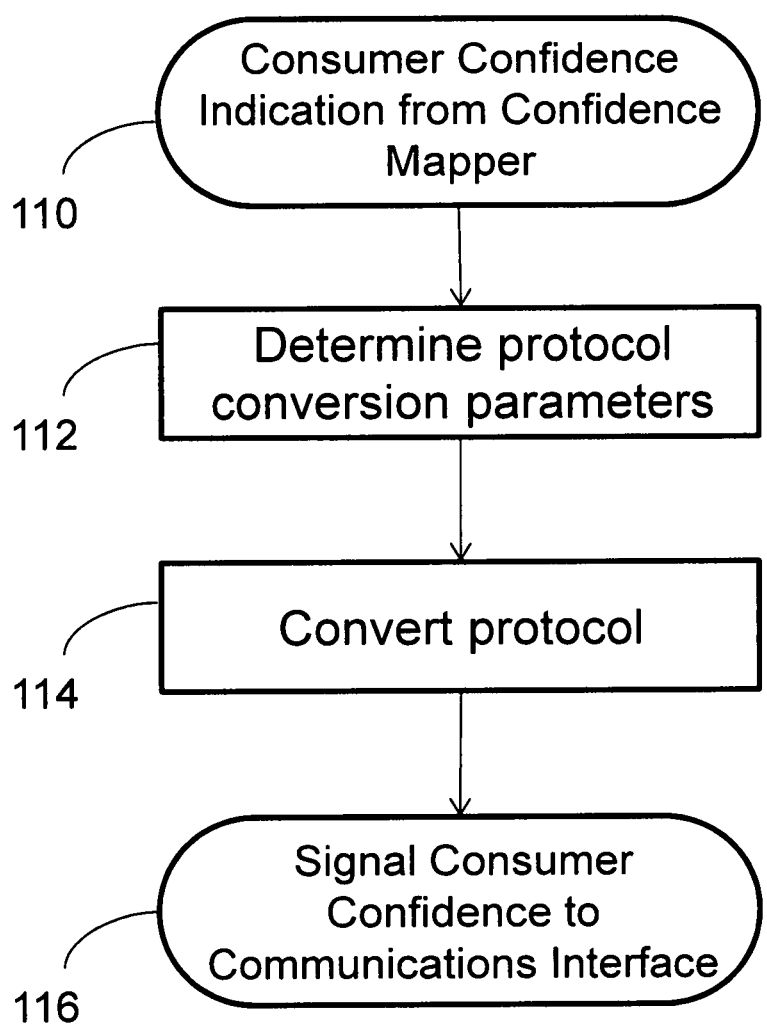
FIG. 8 is a flowchart of the protocol conversion process when a confidence indication is signaled by the confidence mapper.

FIG. 8 is a flowchart of the protocol conversion process when a consumer confidence is signaled by the confidence mapper. In flowchart 2, step 1 110, a consumer confidence indication is signaled by the confidence mapper. In flowchart 2, step 2 112, the protocol conversion parameters are determined for the confidence consumer of the confidence indication. In flowchart 2, step 3 114, the format of the mapped confidence indication is converted. In flowchart 2, step 4 116, the converted mapped confidence indication is signaled to the communications interface.

Figure 9:
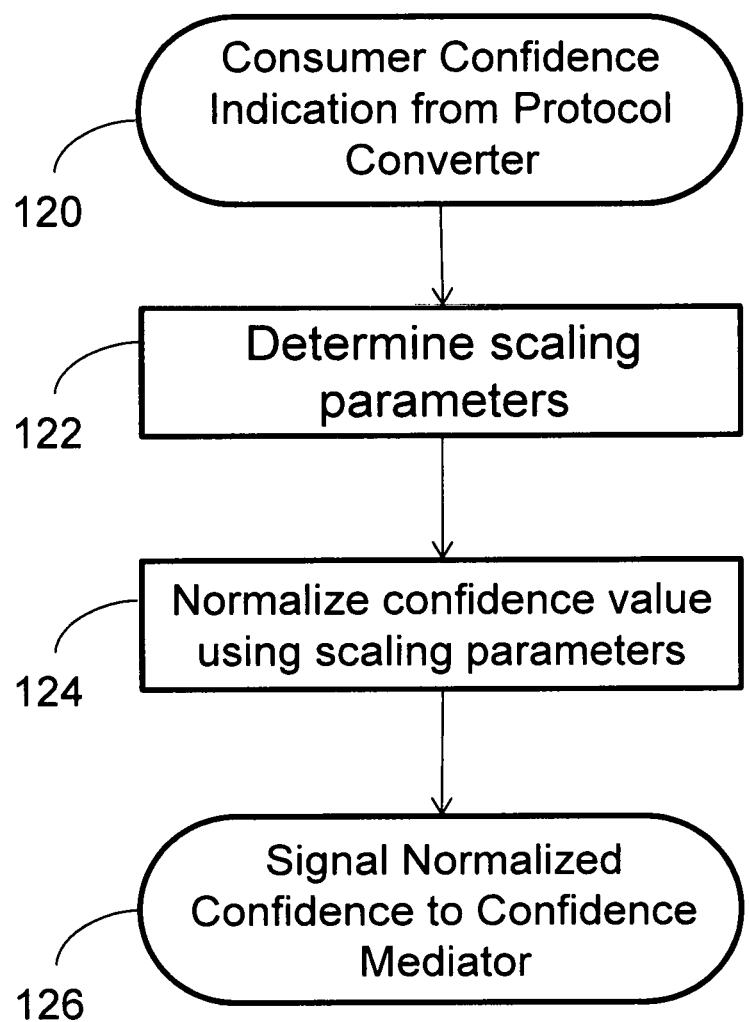
FIG. 9 is a flowchart of the confidence normalization process.

FIG. 9 is a flowchart of the confidence normalization process when a producer confidence is signaled by the protocol converter. In flowchart 3, step 1 120, a producer confidence indication is signaled by the protocol converter. In flowchart 3, step 2 122, the scaling parameters are determined for the confidence producer of the confidence indication. In flowchart 3, step 3 124, the confidence is scaled according to the scaling parameters. In flowchart 3, step 4 126, the normalized confidence indication is signaled to the confidence mediator.

Figure 10:
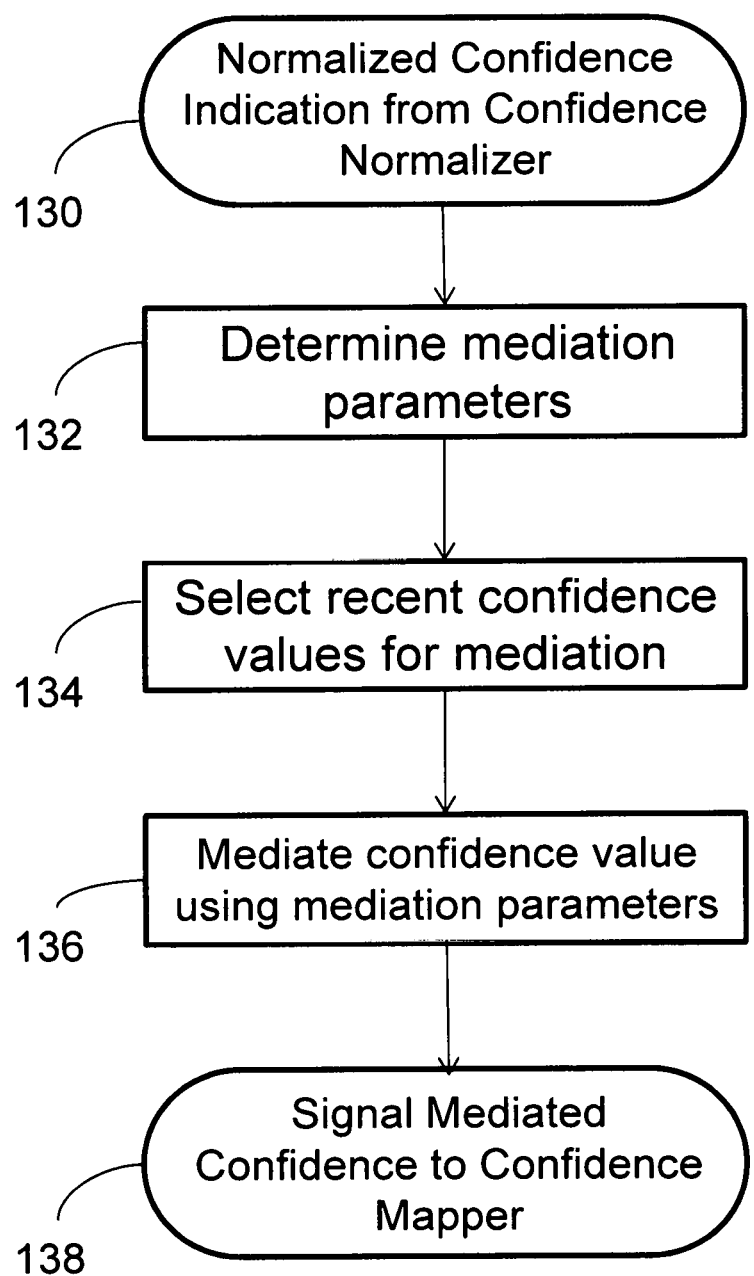
FIG. 10 is a flowchart of the confidence mediation process.

FIG. 10 is a flowchart of the confidence mediation process when a normalized producer confidence is signaled by the confidence normalizer. In flowchart 4, step 1 130, a normalized confidence indication is signaled by the confidence normalizer. In flowchart 4, step 2 132, the mediation parameters are determined for all confidence producers. In flowchart 4, step 3 134, the values included in the mediation calculation are selected in accordance with the mediation parameters from the storage. In flowchart 4, step 4 136, the mediated confidence is calculated using the selected confidence values and the mediation parameters. In flowchart 4, step 5 138, the mediated confidence indication is signaled to the confidence mapper.

Figure 11:
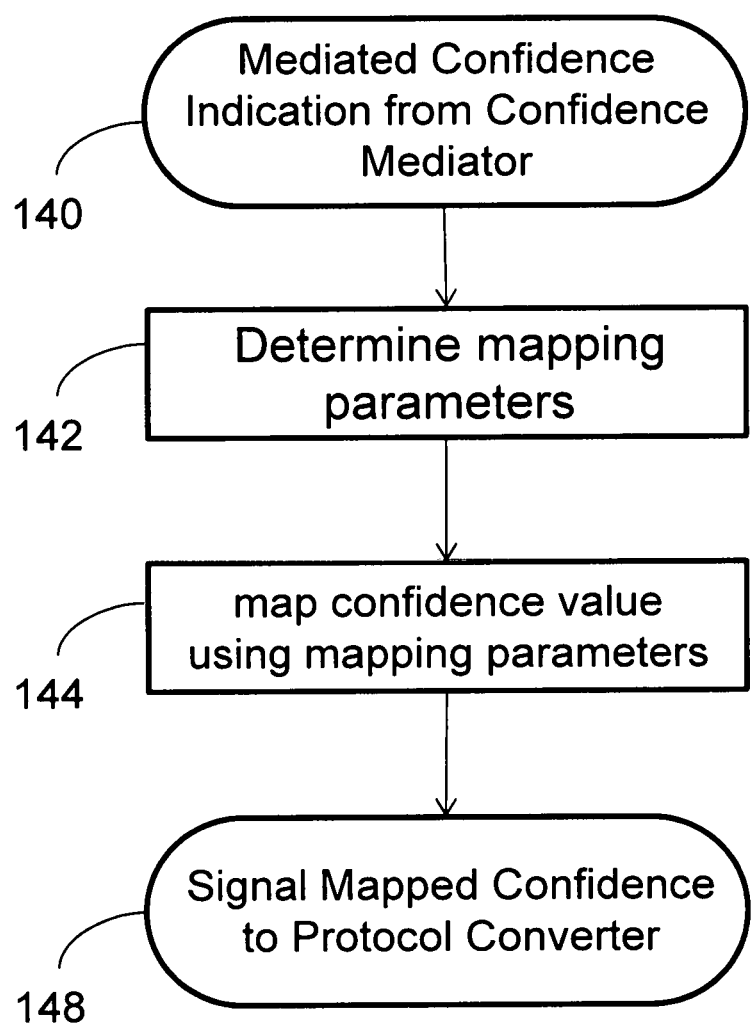
FIG. 11 is a flowchart of the confidence mapping process.

FIG. 11 is a flowchart of the confidence mapping process when a mediated producer confidence is signaled by the confidence mediator. Process is performed for each configured confidence consumer. In flowchart 5, step 1 140, a mediated confidence indication is signaled by the confidence mediator. In flowchart 5, step 2 142, the mapping parameters are determined for the confidence consumer. In flowchart 5, step 3 144, the mapped confidence is calculated using the mapping parameters. In flowchart 5, step 4 146, the mapped confidence indication is signaled to the protocol converter.

Figure 12:
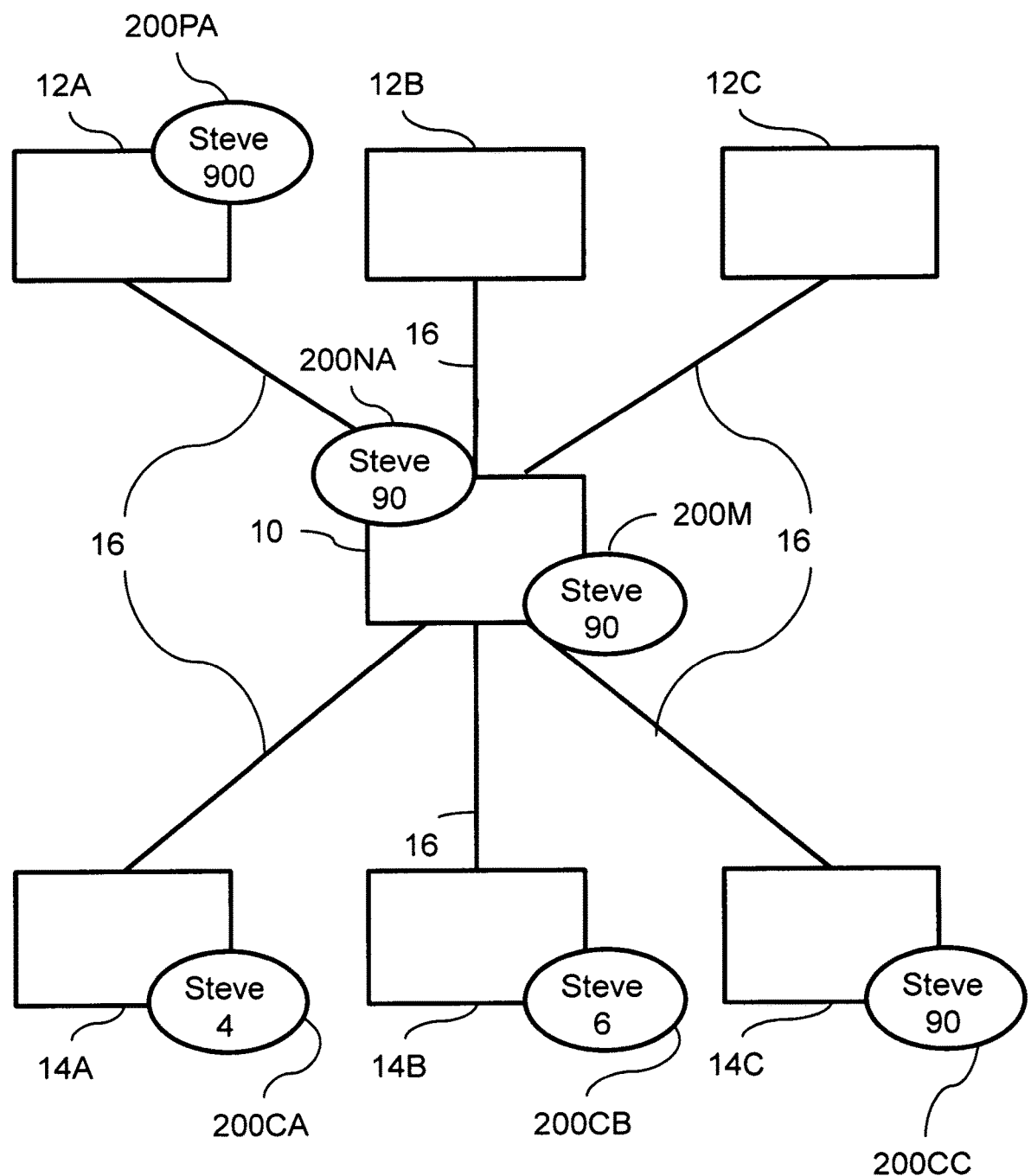
FIG. 12 shows the scaling, mediation and mapping of a confidence as it is processed by the present invention.

FIG. 12 shows a diagram of a confidence broker 10 communicating with a plurality of confidence producers 12A, 12B, 12C and a plurality of confidence consumers 14A, 14B, 14C via a communications infrastructure 16. First confidence producer 12A has generated a Steve First Producer Confidence 200PA value of 900. The confidence broker 10 has normalized this into Steve Normalized Confidence from First Producer 200NA value 90. The confidence broker 10 has mediated this into Steve Mediated Confidence 200M value of 90. The confidence broker 10 has then mapped this into Steve First Consumer Confidence 200CA, Steve Second Consumer Confidence 200CB, and Steve Third Consumer Confidence 200CC with values of 4, 6 and 90 respectively.

Figure 13:
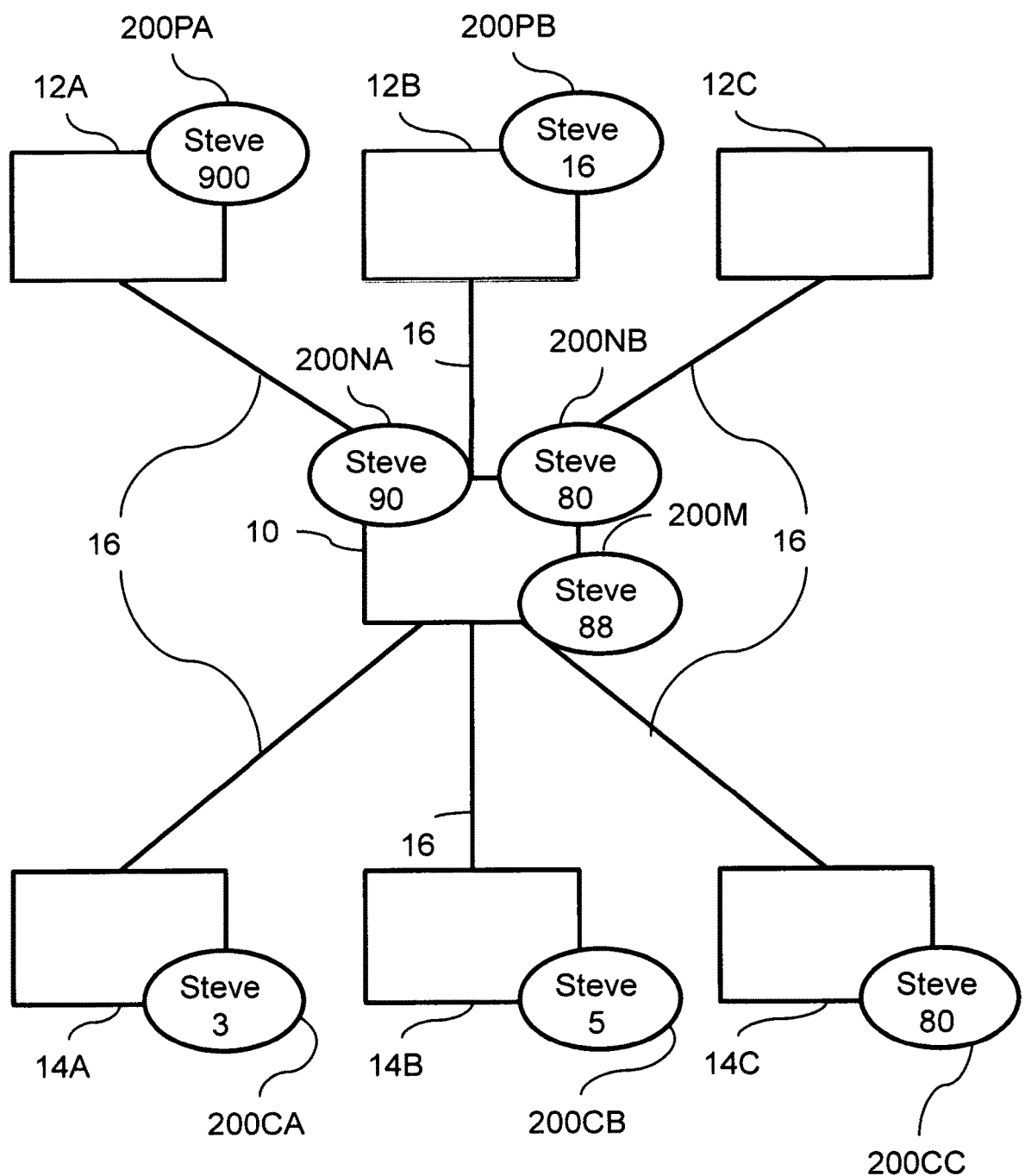
FIG. 13 shows the scaling, mediation and mapping of a second confidence as it is processed by the present invention.

FIG. 13 shows a diagram of a confidence broker 10 communicating with a plurality of confidence producers 12A, 12B, 12C and a plurality of confidence consumers 14A, 14B, 14C via a communications infrastructure 16. First confidence producer 12A has generated a Steve First Producer Confidence 200PA value of 900. The confidence broker 10 has normalized this into Steve Normalized Confidence from First Producer 200NA value 90. Subsequently, confidence producer 12B has generated a Steve Second Producer Confidence 200PB value of 16. The confidence broker 10 has normalized this into Steve Normalized Confidence from Second Producer 200NB value 80. The confidence broker 10 has mediated these two values into Steve Mediated Confidence 200M value of 88. The confidence broker 10 has then mapped this into Steve First Consumer Confidence 200CA, Steve Second Consumer Confidence 200CB, and Steve Third Consumer Confidence 200CC with values of 3, 5 and 80 respectively.

Figure 14:
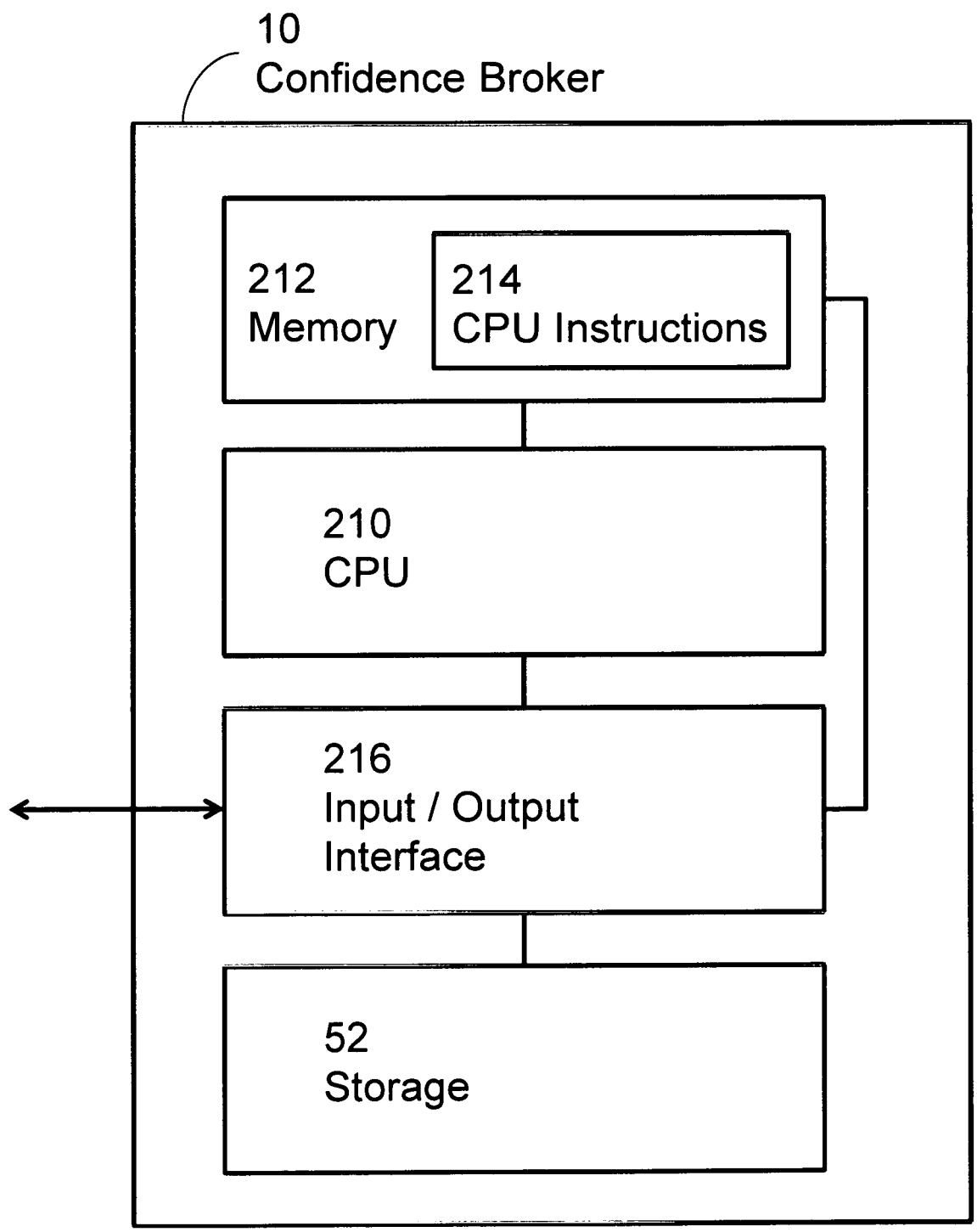
FIG. 14 shows another embodiment of the invention.

FIG. 14 shows another view of one particular embodiment of the invention. The confidence broker 10 includes a CPU 210, memory 212, CPU instructions 214, an input/output interface 216 and storage 218. The input/output interface 216 is connected to the CPU 210, memory 212 and storage 52. The CPU 210 is connected to memory 212. CPU instructions 214 are loaded into in memory 212 until fetched by the CPU 210.

IV. Methods of Operation

The confidence broker 10 receives a producer confidence indication 54 via a communications interface 42. The communications interface 42 signals the producer confidence indication 54 to the protocol converter 44. The protocol converter 44 converts producer confidence indication 54 from the protocol used by the confidence producer 12 to the protocol specified by the protocol conversion parameters. An example of protocol conversion is receiving the producer confidence indication 54 in JSON format and converting it into XML format. The protocol converter 44 may query the storage 52 to determine the parameters of the protocol conversion process.

Once the producer confidence indication 54 is now in the proper format for normalization, it is signaled to the confidence normalizer 46. The confidence normalizer 46 queries the storage 52 to determine the scaling parameters 70 for the confidence producer 12. The scaling parameters 70 include a scaling factor and a scaling offset. Using the scaling parameters 70, the normalized confidence is the calculated using Equation One:

normalized_confidence=
(producer_confidence*scaling_factor)+
scaling_offset                                     Equation One The resulting normalized confidence value, its associated identity, the confidence producer and a timestamp of when the confidence indication was received is stored in the storage 52.

The producer confidence indication 54 with the normalized confidence 56 is signaled to the confidence mediator 48. The confidence mediator 48 generates a mediated confidence 58 using previous normalized confidences 56 generated by different confidence producers 12 that meet a criteria. The criteria is specified in the mediation parameters 80 stored in the storage 52 The normalized confidences 56 are selected from the normalized confidences 56 that have been stored in the storage 52 by the confidence normalizer 46. In a preferred embodiment, the criteria for selecting normalized confidences 56 is recency. This selects normalized confidences that have been received within a specified time span, such as the last 30 minutes. Once the normalized confidences have been selected, they are combined to form a mediated confidence. In a preferred embodiment, each confidence producer has an assigned weighting. These weightings are used to produce a weighted average of the selected normalized confidences. The resulting mediated confidence value, its associated identity, the confidence producer and a timestamp of the mediation process is stored in the storage 52.

The producer confidence indication 54 with the mediated confidence 58 is signaled to the confidence mapper 50. The confidence mapper 50 generates a consumer confidence indication 60 for each of the confidence consumers 14. The confidence mapper 50 queries the storage 52 to determine the mapping parameters 90 for each confidence consumer 14. Using the mapping parameters 90, the confidence mapper 50 generates a consumer confidence indication 60 for each of the confidence consumers 14. The process of confidence mapping takes confidence ranges and maps them into discrete consumer confidence values. For example, first confidence consumer 14A may have 4 policy enforcement options, numbered 1-4. Mediated confidence values 1-49 are mapped to first confidence consumer 14A confidence value 1, mediated confidence values 50-79 are mapped to first confidence consumer 14A confidence value 2, mediated confidence values 80-89 are mapped to first confidence consumer 14A confidence value 3 and mediated confidence values 90-100 are mapped to first confidence consumer 14A confidence value 4. Second confidence consumer 14B has 8 policy enforcement confidences, but only 4 of those confidence consumer values are used. Mediated confidence values 1-49 are mapped to second confidence consumer 14B confidence value 3, mediated confidence values 50-79 are mapped to second confidence consumer 14B confidence value 4, mediated confidence values 80-89 are mapped to second confidence consumer 14B confidence value 5 and mediated confidence values 90-100 are mapped to second confidence consumer 14B confidence value 6. The resulting mapped confidence value, its associated identity, the confidence consumer and a timestamp of the mapping process is stored in the storage 52.

The consumer confidence indication 60 with the confidence consumer specific confidence value is signaled to the protocol converter 44. The protocol converter 44 performs protocol conversion. An example of protocol conversion is internally using XML format and sending the consumer confidence indication 60 in JSON format. The protocol converter 44 may query the storage 52 to determine the parameters of the protocol conversion process.

The protocol converter 44 signals the consumer confidence indication 60 to the communications interface 42 for communication to the confidence consumer 14.

V. Example of One Implementation of the Invention

Using the confidence broker 10, the three confidence producers 12A, 12B, 12C and three confidence consumers 14A, 14B, 14C in FIG. 1, and using the scaling parameters 70 in FIG. 4, the mediation parameters 80 in FIG. 5 and the mapping parameters 90 in FIG. 6 we can now trace the operation of the confidence broker 10.

The confidence broker 10 is operating a computing environment where flows of network traffic and storage accesses are being authorized using identity credentials. The authorities assigned to those identity credentials are modified in accordance with the confidences assigned to the identity credentials. In this scenario, user Steve logs onto his work laptop. In this process, he provides his identity in the form of a smartcard. A smartcard is an identity credential in hardware, rendering it tamper resistant. The smartcard contains a PKI certificate issued to Steve. Because Steve is using a smartcard that contains a valid PKI certificate, first confidence producer 12A, generates a producer confidence value of 900 200 PA. This producer confidence value is signaled to the confidence broker in a confidence producer indication 54. First confidence producer 12A generates confidence values in the range of 1-1000. First confidence producer 12A has been configured at the confidence broker 10 with the scaling parameters 70 of a scaling factor of 0.1 and a scaling offset of 0. Using Equation One:

$$\text{normalized\_confidence} = (\text{producer\_confidence} * \text{scaling\_factor}) + \text{scaling\_offset} \quad \text{Equation One}$$

The resulting normalized confidence value is 90 200 NA. The normalized confidence value of 90, the identity of Steve, the confidence producer "first confidence producer" and the time the confidence was generated, 8:05 am, are stored in the storage 52.

The normalized confidence 56 is now processed into a mediated confidence 58. Because this is Steve's first logon of the day, mediation finds no additional producer confidence events that match the mediation parameters 80. This results in the mediated confidence 58 being the same as the normalized confidence 56 value of 90 100 M.

The mediated confidence 58 is now processed into a series of consumer confidences and consumer confidence indications 60. Using the mapping parameters 90, the mediated confidence value of 90 is mapped to Steve First Consumer Confidence 200CA, Steve Second Consumer Confidence 200CB, and Steve Third Consumer Confidence 200CC with values of 4, 6 and 90 respectively.

Given Steve's strong authenticated identity and resulting high confidence score, Steve is allowed to log onto a network database. Once Steve has logged onto the network database, Steve attempts to access a restricted record. Steve's access attempt is stopped by the database and an indication is made to the database analytics system, second confidence producer 12B.

Second confidence producer 12B generates a Steve Second Producer Confidence 200PB value of 16. This producer confidence value is signaled to the confidence broker in a confidence producer indication 54. Second confidence producer 12B generates confidence values in the range of 1-20. Second confidence producer 12B has been configured at the confidence broker 10 with the scaling parameters 70 of a scaling factor of 5 and a scaling offset of 0. Using the scaling formula, the resulting normalized confidence value is 80 200 NB. The normalized confidence value of 80, the identity of Steve, the confidence producer "second confidence producer" and the time the confidence was generated, 8:15 am, are stored in the storage 52.

The normalized confidence 56 is now processed into a mediated confidence 58. The producer confidence indication 54 occurred at 8:15. The mediation parameters 80 for first confidence producer 12A is 30 minutes, making the current producer confidence from second confidence producer 12B and the producer confidence from first confidence producer 12A eligible for inclusion in the mediation calculation. Using the weights in mediation parameters 80, a new mediated confidence value of 88 200 M is calculated.

The mediated confidence 58 is now processed into a series of consumer confidences and consumer confidence indications 60. Using the mapping parameters 90, the mediated confidence value of 88 is mapped to Steve First Consumer Confidence 200CA, Steve Second Consumer Confidence 200CB, and Steve Third Consumer Confidence 200CC with values of 3, 5 and 80 respectively. Because these consumer confidence values are lower than the previous values, Steve is prevented from accessing the database until he explains his actions to his manager.

VI. Apparatus for a Confidence Broker

One embodiment of a Confidence Broker comprises the components shown in FIG. 2, including a communication interface 42, a protocol converter 44, a confidence normalizer 46, a confidence mediator 48, a confidence mapper 50 and storage 52.

The communications interface 42 includes circuits and logic for processing the signals generated by the communications infrastructure 16 and the protocol converter 44. The communications interface 42 includes circuits and logic (not shown) to generate signals for communicating to communications infrastructure 16 and the protocol converter 44. The communications infrastructure is an external system that provides the communications between the confidence broker 10, a confidence producer 12 and a confidence consumer 14. Example communications infrastructures include network infrastructures such as Ethernet, WiFi, LTE, serial communications infrastructures, parallel communications infrastructures, wireless infrastructures, memory interfaces, and optical communications infrastructures. The circuits and logic of the communications interface 42 can be implemented using one of more of the following technologies—application specific integrated circuits (ASICs), gate arrays, field programmable gate arrays (FPGAs), processors with custom firmware, memory and storage. In one embodiment of a confidence broker 10, the communications interface 42 is implemented using an input/output interface 216.

The protocol converter 44 includes circuits and logic for processing the signals generated by the communications interface 42 and for generating signals for communicating with the communications interface 42. The protocol converter 44 includes circuits and logic for processing the signals generated by the confidence normalizer 46, the confidence mapper 50 and the storage 52 and for generating signals for communicating with the confidence normalizer 46, the confidence mapper 50, and the storage 52. The protocol converter 44 includes circuits and logic (not shown) to convert the data communicated by the signals generated by the communications interface 42 to the data format specified by the protocol converter parameters. The protocol converter 44 includes circuits and logic to convert the data communicated by the signals generated by the confidence mapper 50 to the data format specified by the protocol converter parameters. The circuits and logic of the protocol converter 44 can be implemented using one of more of the following technologies application specific integrated circuits (ASICs), gate arrays, field programmable gate arrays (FPGAs), processors with custom firmware, memory and storage. In one embodiment of a confidence broker 10, the protocol converter 44 is implemented using a CPU 210, memory 212 and CPU instructions 214.

The confidence normalizer 46 includes circuits and logic for processing the signals generated by the protocol converter 44, the confidence mediator 48, and the storage 52 and for generating signals for communicating with the protocol converter 44, the confidence mediator 48, and the storage 52. The confidence normalizer 46 includes circuits and logic (not shown) to normalize the confidence values communicated by the signals generated by the protocol converter 44 in accordance with the scaling parameters 70. The circuits and logic of the confidence normalizer 46 can be implemented using one of more of the following technologies application specific integrated circuits (ASICs), gate arrays, field programmable gate arrays (FPGAs), processors with custom firmware, memory and storage. In one embodiment of a confidence broker 10, the confidence normalizer 46 is implemented using a CPU 210, memory 212 and CPU instructions 214.

The confidence mediator 48 includes circuits and logic for processing the signals generated by the confidence normalizer 46, the confidence mapper 50, and the storage 52 and for generating signals for communicating with the confidence normalizer 46, the confidence mapper 50, and the storage 52. The confidence normalizer 46 includes circuits and logic (not shown) to mediate the confidence values communicated by the signals generated by the confidence normalizer 46 in accordance with the mediation parameters 80. The circuits and logic of the confidence mediator 48 can be implemented using one of more of the following technologies application specific integrated circuits (ASICs), gate arrays, field programmable gate arrays (FPGAs), processors with custom firmware, memory and storage. In one embodiment of a confidence broker 10, the confidence mediator 48 is implemented using a CPU 210, memory 212 and CPU instructions 214.

The confidence mapper 50 includes circuits and logic for processing the signals generated by the protocol converter 44, the confidence mediator 48, and the storage 52 and for generating signals for communicating with the protocol converter 44, confidence mediator 46, and the storage 52. The confidence normalizer 46 includes circuits and logic (not shown) to map the confidence values communicated by the signals generated by the confidence normalizer 46 in accordance with the mapping parameters 90. The circuits and logic of the confidence mapper 50 can be implemented using one of more of the following technologies application specific integrated circuits (ASICs), gate arrays, field programmable gate arrays (FPGAs), processors with custom firmware, memory and storage. In one embodiment of a confidence broker 10, the confidence mapper 50 is implemented using a CPU 210, memory 212 and CPU instructions 214.

The storage 52 includes circuits and logic for processing the signals generated by the protocol converter 44, the confidence normalizer, the confidence mediator 48, and the confidence mapper 50, and for generating signals for communicating with the protocol converter 44, the confidence normalizer, the confidence mediator 48, and the confidence mapper 50. The storage 52 includes circuits, logic (not shown) and physical media, when necessary, to store and retrieve information provided or requested by the signals generated by protocol converter 44, the confidence normalizer, the confidence mediator 48, and the confidence mapper 50. The circuits and logic of the storage 52 can be implemented using one of more of the following technologies application specific integrated circuits (ASICs), gate arrays, field programmable gate arrays (FPGAs), processors with custom firmware, memory and storage. The physical media of the storage 52 can be implemented using non-volatile memory technology such as FLASH, linear magnetic media such as tape, spinning magnetic media such as disk, optical media such as writable DVDs, or any other technology that satisfies the storage requirements. The storage 52 may include cache memory or other performance optimization mechanisms.

CONCLUSION

Although the present invention has been described in detail with reference to one or more preferred embodiments, persons possessing ordinary skill in the art to which this invention pertains will appreciate that various modifications and enhancements may be made without departing from the spirit and scope of the claims that follow. The various alternatives for providing an efficient means for statistical object identity that have been disclosed above are intended to educate the reader about preferred embodiments of the invention, and are not intended to constrain the limits of the invention or the scope of Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

10 Confidence Broker
12 Confidence Producer
12A First Confidence Producer
12B Second Confidence Producer
12C Third Confidence Producer
14 Confidence Consumer
14A First Confidence Consumer
14B Second Confidence Consumer
14C Third Confidence Consumer
16 Communications Infrastructure
42 Communications Interface
44 Protocol Converter
46 Confidence Normalizer
48 Confidence Mediator
50 Confidence Mapper
52 Storage
54 Producer Confidence Indication
56 Normalized Confidence
58 Mediated Confidence
60 Consumer Confidence Indication
62 Management Communications
70 Scaling Parameters
80 Mediation Parameters
90 Mapping Parameters
92 Normalized Confidence Ranges
94 Mapped Consumer Confidences
100 Flowchart 1, Step 1
102 Flowchart 1, Step 2
104 Flowchart 1, Step 3
106 Flowchart 1, Step 4
110 Flowchart 2, Step 1
112 Flowchart 2, Step 2
114 Flowchart 2, Step 3
116 Flowchart 2, Step 4
120 Flowchart 3, Step 1
122 Flowchart 3, Step 2
124 Flowchart 3, Step 3
126 Flowchart 3, Step 4
130 Flowchart 4, Step 1
132 Flowchart 4, Step 2
134 Flowchart 4, Step 3
136 Flowchart 4, Step 4
138 Flowchart 4, Step 5
140 Flowchart 5, Step 1
142 Flowchart 5, Step 2
144 Flowchart 5, Step 3
146 Flowchart 5, Step 4
200PA Steve First Producer Confidence
200PB Steve Second Producer Confidence
200NA Steve Normalized Confidence from First Producer
200NB Steve Normalized Confidence from Second Producer
200M Steve Mediated Confidence
200CA Steve First Consumer Confidence
200CB Steve Second Consumer Confidence
200CC Steve Third Consumer Confidence
210 CPU
212 Memory
214 CPU Instructions
216 Input/Output Interface

What is claimed is:

1. An apparatus for processing one of a plurality of confidence indications in connection with permitting an action, comprising:
  a plurality of confidence producers;
  a plurality of confidence consumers;
  a confidence broker; and
  a communications infrastructure;
  said confidence broker being connected with said communications infrastructure;
  said confidence broker is configured to communicate with said plurality of confidence producers using said communications infrastructure;
  said confidence broker is configured to communicate with said plurality of confidence consumers using said communications infrastructure;
  said confidence broker including a computer processing unit (CPU);
  said CPU being connected to a memory;
  said memory including custom designed software for controlling the activity of said confidence broker;
  said plurality of confidence producers are configured to produce said plurality of confidence indications;
  said confidence broker is configured to receive said one of said plurality of confidence indications from one of said plurality of confidence producers;
  said confidence indication including an identity and a confidence value;
  said confidence broker is configured to normalize said confidence value to a normalized confidence value;
  said confidence broker is configured to mediate said normalized confidence value to a mediated confidence value;
  said confidence broker is configured to select one of said plurality of confidence consumers from said plurality of confidence consumers;
  said confidence broker is configured to map said mediated confidence value to a mapped confidence value;
  said confidence broker is configured to convey a mapped confidence indication to said selected confidence consumer, wherein said selected confidence consumer is a policy enforcement system;
  said mapped confidence indication including said identity and said mapped confidence value; and
  said policy enforcement system of said selected confidence consumer is configured to determine whether to permit the action based on said identity of said mapped confidence indication and based on said mapped confidence value of said mapped confidence indication;
  wherein said confidence producers further are configured to provide more robust information for security enforcement using identity credentials by producing said confidence indications.

2. The apparatus as recited in claim 1 in which:
  said confidence broker is configured to normalize applies a scaling factor to said confidence value.

3. The apparatus as recited in claim 1 in which:
said confidence broker is configured to normalize applies a scaling offset to said confidence value.

4. The apparatus as recited in claim 1 in which:
said confidence broker is configured to mediate selects confidence values to include in the mediation calculation using recency.

5. The apparatus as recited in claim 1 in which:
said confidence broker is configured to mediate applies a weight in the calculation of said mediated confidence value.

6. The apparatus as recited in claim 1 in which:
said confidence broker is configured to map uses range matching to determine the mapped confidence value.

7. The apparatus as recited in claim 1 in which:
said identity is a PKI certificate.

8. The apparatus as recited in claim 7 in which:
said PKI certificate originates from a smart card.

9. The apparatus as recited in claim 1 in which:
said communications infrastructure is a network infrastructure.

10. The apparatus as recited in claim 1 in which:
said confidence broker is configured to receive said one of said plurality of confidence indications from one of said plurality of confidence producers; and
said confidence broker is configured to convert said confidence indication from the received data format to an internal data format.

11. The apparatus as recited in claim 1 in which:
said confidence broker is configured to map said mediated confidence value to a mapped confidence value; and
said confidence broker is configured to convert said confidence indication from an internal data format to said the data format of said selected confidence consumer.

12. The apparatus as recited in claim 1 in which:
one of said confidence producers is an analytics system.

13. The apparatus as recited in claim 12 in which:
said analytics system is configured to produce a score within a range.

14. The apparatus as recited in claim 1 in which:
one of said plurality of confidence producers is unable to interoperate with one of said plurality of confidence consumer in the absence of said confidence broker.

15. The apparatus as recited in claim 1 in which:
each of said plurality of confidence producers has a different definition of confidence.

16. The apparatus as recited in claim 1 in which:
each of said plurality of confidence consumers has a different definition of confidence.

17. The apparatus as recited in claim 1 in which:
said confidence producers are configured to produce said confidence indications to make security systems more robust and secure.

18. The apparatus as recited in claim 1 in which:
said confidence consumers are configured to consume said confidence indications to make security systems more robust and secure.

19. The apparatus as recited in claim 1 in which:
said confidence broker is configured to make security systems more robust and secure.

20. The apparatus as recited in claim 1 in which:
said confidence broker is configured to normalize for the purpose of enabling said confidence producers which have different confidence scales to be evaluated together.

* * * * *